United States Patent
Rothman et al.

(10) Patent No.: US 7,159,105 B2
(45) Date of Patent: Jan. 2, 2007

(54) PLATFORM-BASED OPTIMIZATION ROUTINES PROVIDED BY FIRMWARE OF A COMPUTER SYSTEM

(75) Inventors: Michael A. Rothman, Olympia, WA (US); Vincent J. Zimmer, Federal Way, WA (US)

(73) Assignee: Intel Corporation, Santa Clara, CA (US)

(*) Notice: Subject to any disclaimer, the term of this patent is extended or adjusted under 35 U.S.C. 154(b) by 509 days.

(21) Appl. No.: 10/611,122

(22) Filed: Jun. 30, 2003

(65) Prior Publication Data

US 2004/0268109 A1 Dec. 30, 2004

(51) Int. Cl.
*G06F 15/177* (2006.01)
(52) U.S. Cl. .......................................... 713/1
(58) Field of Classification Search ............... None
See application file for complete search history.

(56) References Cited

U.S. PATENT DOCUMENTS 5,481,713 A * 1/1996 Wetmore et al. ............ 717/170
6,381,693 B1 * 4/2002 Fish et al. ..................... 713/1
6,990,576 B1 * 1/2006 Qureshi et al. ................ 713/2

OTHER PUBLICATIONS

Intel, Extensible Firmware Interface Specification, Dec. 12, 2000, version 1.02.*

* cited by examiner

Primary Examiner—Lynne H. Browne
Assistant Examiner—Anand B. Patel
(74) Attorney, Agent, or Firm—Blakely, Sokoloff, Taylor & Zafman LLP (57) ABSTRACT

A method and system to provide platform-based optimization routines by firmware of a computer system. During a pre-boot phase of a computer system, the firmware identifies one or more hardware devices, such as a central processing unit (CPU) or chipset, of a computer system. The firmware determines an optimized routine library for the one or more hardware devices from a set of optimized routine libraries. The firmware advertises the optimized routine library corresponding to the one or more hardware devices to the computer system for use by an operating system or application. In one embodiment, the firmware of the computer system operates in accordance with the Extensible Firmware Interface (EFI) framework standard.

29 Claims, 4 Drawing Sheets

PLATFORM-BASED OPTIMIZATION ROUTINES PROVIDED BY FIRMWARE OF A COMPUTER SYSTEM

BACKGROUND OF THE INVENTION

1. Field of the Invention

The field of invention relates generally to computer systems and, more specifically but not exclusively, relates to providing platform-based optimization routines by firmware of a computer system.

2. Background Information

In a typical PC architecture, the initialization and configuration of the computer system by the Basic Input/Output System (BIOS) is commonly referred to as the pre-boot phase. It is generally defined as the firmware that runs between the processor reset and the first instruction of the Operating System (OS) loader. At the start of a pre-boot, it is up to the code in the firmware to initialize the system to the point that an operating system loaded off of media, such as a hard disk, can take over. The start of the OS load begins the period commonly referred to as OS runtime. During OS runtime, the firmware acts as an interface between software and hardware components of a computer system. As computer systems have become more sophisticated, the operational environment between the application and OS levels and the hardware level is generally referred to as the firmware or the firmware environment.

Modern operating systems often have access to optimized instruction sets (or routines) for execution on particular pieces of hardware. For example, the Intel Pentium III processor includes an instruction set called SSE (Streaming SIMD (Single Instruction, Multiple Data) Extensions). SSE is a set of microprocessor instructions that allow software to call specific processor functions. By using these routines optimized for the Pentium III, operating systems and software applications can maximize the capabilities of the CPU (central processing unit). The optimized instructions reduce the overall number of instructions required to execute a particular program task and as a result can contribute to an overall performance increase of an operating system and/or application.

However, operating system and application code is compiled with specific CPU's in mind and without platform-specific knowledge. For example, software written and compiled for an SSE CPU may not take full advantage of new instructions of an SSE2 CPU. Other hardware components, such as a chipset, may also have optimized routines that cannot be fully anticipated at the time of software production. Additionally, hardware manufacturers are tied to software development to ensure new software can take full advantage of new hardware optimization routines. Often, OS and application release dates lag behind hardware updates and improvements from platform vendors.

BRIEF DESCRIPTION OF THE DRAWINGS

The present invention is illustrated by way of example and not limitation in the accompanying figures.

DETAILED DESCRIPTION

Embodiments of a method and system to provide platform-based optimization routines by firmware of a computer system are described herein. In the following description, numerous specific details are set forth, such as embodiments pertaining to the Extensible Firmware Interface (EFI) framework standard, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the invention, a mechanism is disclosed to provide platform-based optimization routines to a computer system. Firmware has intimate knowledge of the specific hardware elements of a computer system platform. With this knowledge, firmware can provide information to operating systems and applications so that the software executes at peak efficiency. During the pre-boot phase, the firmware of the computer system identifies the installed hardware devices. The firmware determines if an optimized routine library matching the current platform configuration is available. The library contains hardware routines that may not have been available when the operating system or application was compiled. If such a library is found, this library is advertised for use by the operating system or application to speed up the software's operations.

In accordance with one embodiment, firmware of a computer system provides platform-based optimization routines in accordance with an extensible firmware framework known as the Extensible Firmware Interface (EFI) (specifications and examples of which may be found at http://developer.intel.com/technology/efi). EFI is a public industry specification that describes an abstract programmatic interface between platform firmware and shrink-wrap operating systems or other custom application environments. The EFI framework standard includes provisions for extending BIOS functionality beyond that provided by the BIOS code stored in a platform's BIOS device (e.g., flash memory). More particularly, EFI enables firmware, in the form of firmware modules and drivers, to be loaded from a variety of different resources, including primary and secondary flash devices, option ROMs (Read-Only Memory), various persistent storage devices (e.g., hard disks, CD-ROM (Compact Disk-Read Only Memory), etc.), and even over computer networks.

Figure 1:
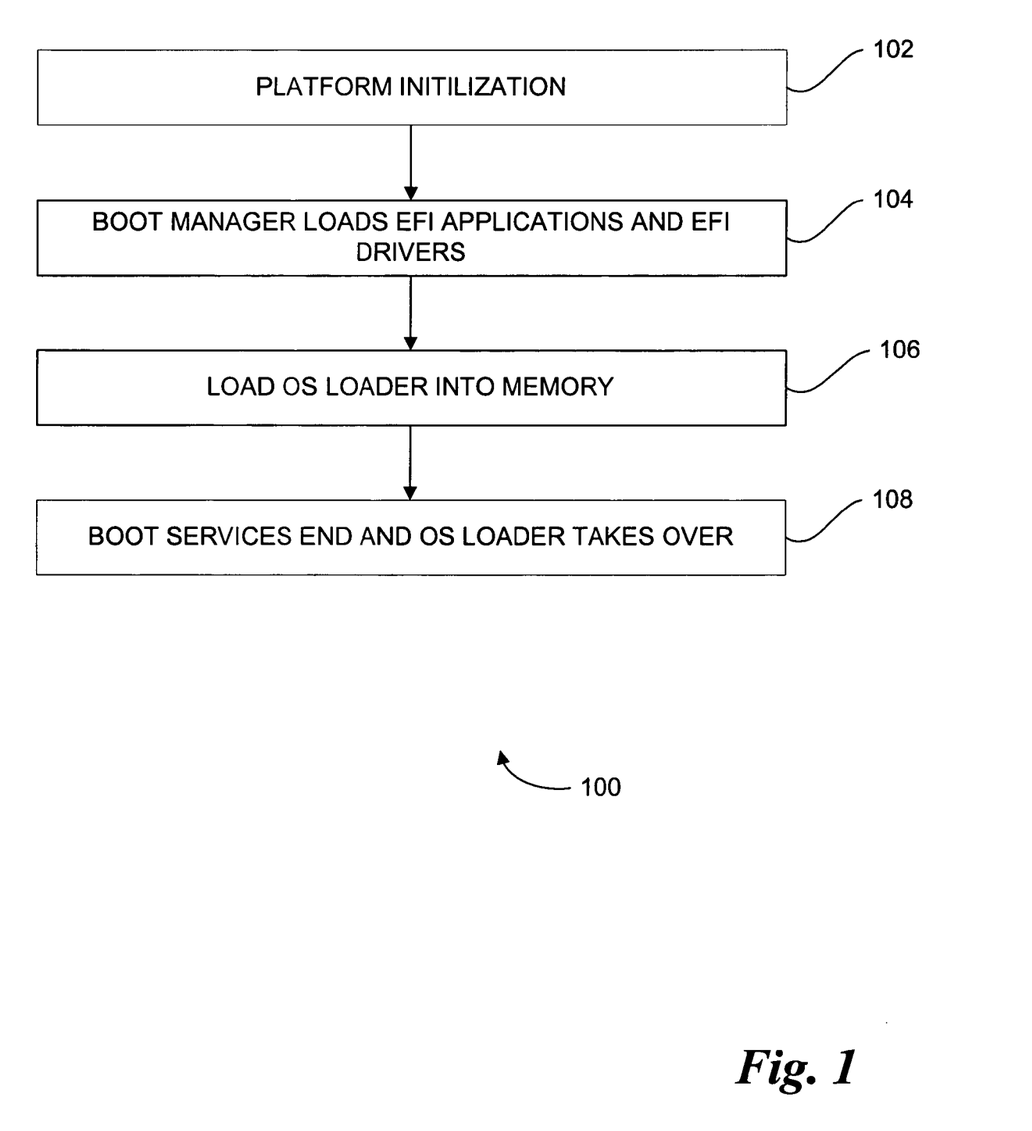
FIG. 1 a schematic diagram illustrating one embodiment of the Extensible Firmware Interface (EFI) framework standard in accordance with the teachings of the present invention.

FIG. 1 shows an event sequence diagram 100 used to illustrate operations performed by a computer system under one implementation of the EFI framework standard. In a block 102, power is added to a computer system and the platform initialization phase begins. This phase provides a standardized method of loading and invoking specific initial configuration routines for the processor, chipset, and motherboard. The initialization phase is responsible for initializing enough of the system to provide a stable base for the follow on phases. Initialization of the platform's core components, including the processor, chipset and main board (i.e., motherboard) is performed during this phase. This phase is also referred to as the "early initialization" phase. Typical operations performed during this phase include the POST (power-on self test) routine, and discovery of platform resources, such as memory.

Once the EFI firmware is initialized, it passes control to a Boot Manager, as depicted in a block 104. The Boot Manager is a firmware policy engine that loads EFI applications and EFI drivers into memory in a pre-defined order. EFI applications are modular code that may perform specific tasks outside of the OS environment. EFI drivers are modules of code that provide device support during the boot process or during OS runtime.

Figure 2:
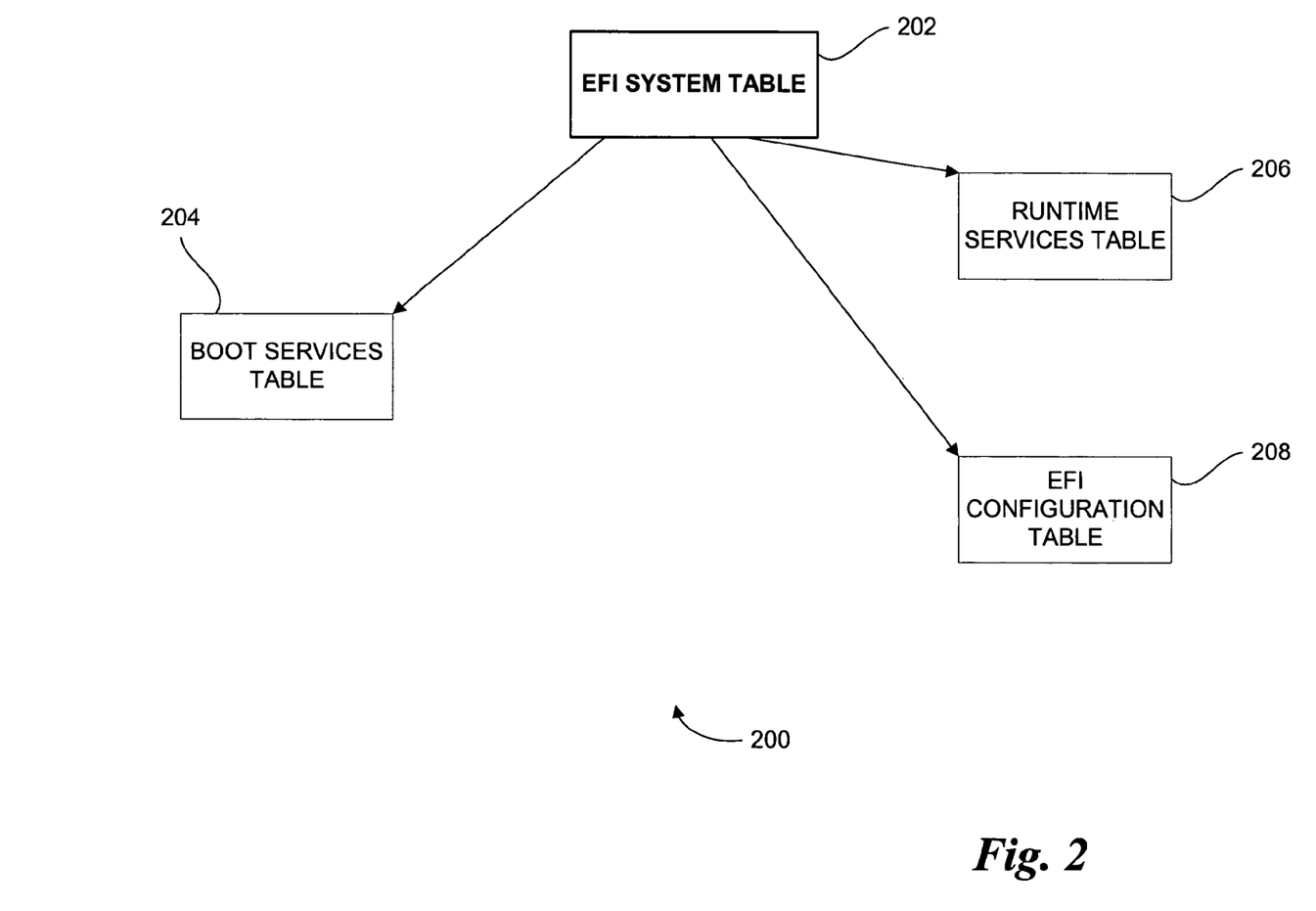
FIG. 2 is a schematic diagram illustrating one embodiment of an EFI table structure in accordance with the teachings of the present invention.

Referring to FIG. 2, the Boot Manager uses an EFI System Table 202 that is produced by the EFI core. The EFI System Table 202 contains standard input and output handles for an EFI application, as well as pointers to the Boot Services Table 204 and Runtime Services Table 206. The EFI specification defines two types of EFI Services: Boot Services and Runtime Services. Boot Services are not available after an OS Loader has taken control of the platform. Boot Services include, but are not limited to, Memory Services, Event and Time Services, and Image Services. In contrast to Boot Services, Runtime Services are available both during pre-boot and OS runtime. Runtime Services include, but are not limited to, Reset Services, Status Code Services, and Virtual Memory Services. The EFI System Table 202 also contains and EFI Configuration Table 208 (described further below).

Referring again to FIG. 1, in a block 106, the EFI OS Loader is loaded into memory. The OS Loader is the first piece of operating system code loaded by the firmware to initiate the OS boot process. The OS Loader is loaded at a fixed address and then executed. In one embodiment, a user is presented with a user interface generated by firmware to select the operating system to be booted. An EFI OS Loader can support multiple OS boot options. An EFI OS Loader can also support legacy boot options such as booting from the A: drive or C: drive of the computer system.

Once the OS Loader is loaded, control of the computer system is transferred to the OS Loader, as shown in a block 108. If the OS Loader successfully loads its operating system, it can take control of the platform by using the Boot Service ExitBootServices. After successfully calling ExitBootServices, all boot services in the system are terminated. From this point the OS Loader is responsible for continued operation of the computer system. If the load of the OS fails, then the OS Loader returns an Exit call and control of the system is returned to the EFI firmware Referring to FIG. 3, a flowchart 300 shows one embodiment of a method to provide platform-based optimization routines to a computer system by firmware. The process begins in a block 302, which corresponds to a system startup event, i.e., a cold boot or a system reset.

Figure 3:
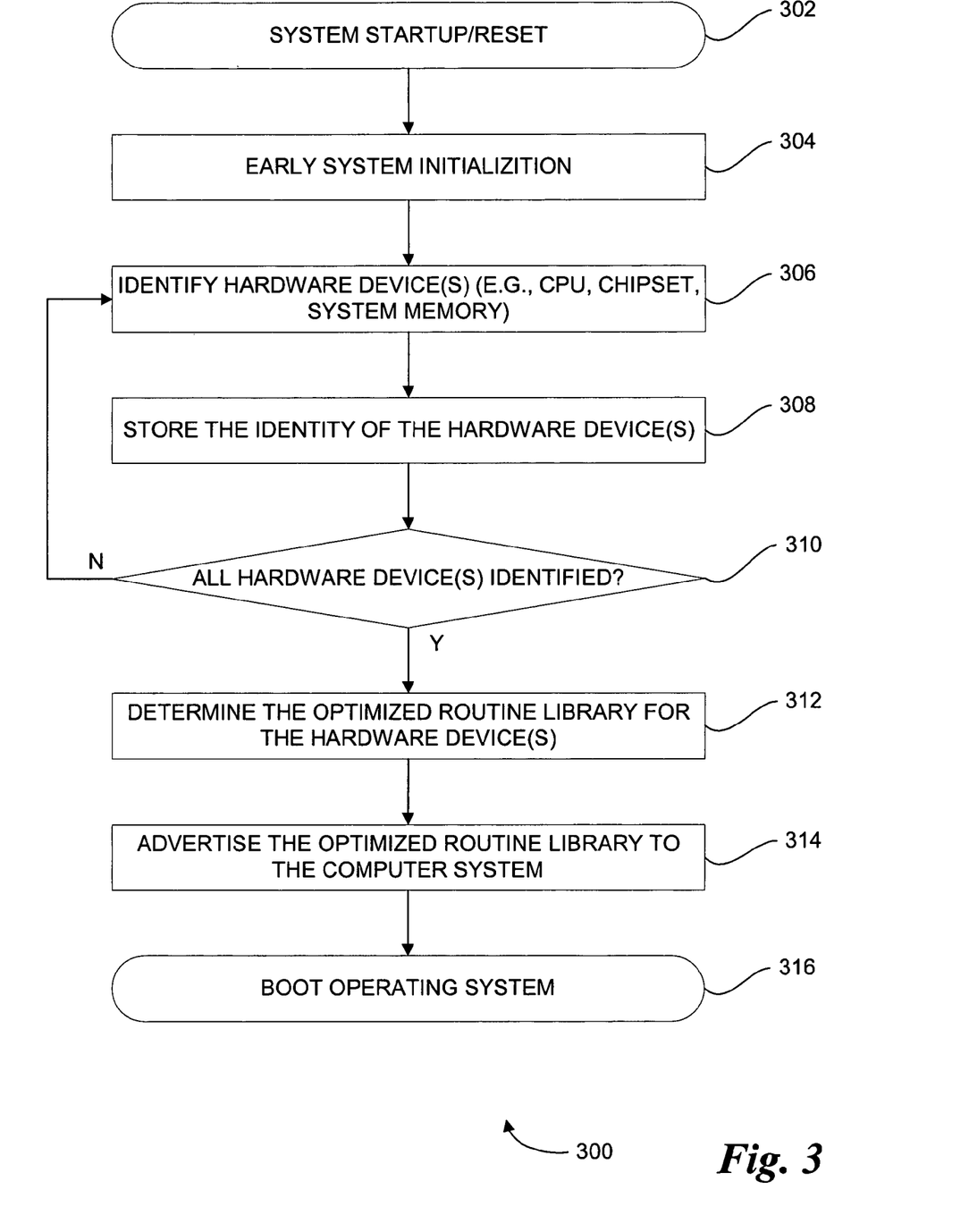
FIG. 3 is a flowchart illustrating one embodiment of the logic and operations to provide platform-based optimization routines by firmware of a computer system in accordance with the teachings of the present invention.

In response to the startup event, pre-boot initialization of the computer system will begin through loading and execution of system boot instructions stored in the computer system BIOS firmware, as depicted by a block 304. In one embodiment, the system boot instructions will begin initializing the platform by conducting a Power-On Self-Test (POST) routine, initializing system board functions, checking for any expansion boards that hold additional BIOS code, and loading such BIOS code if any is found.

Proceeding to a block 306, the firmware of the computer system identifies one or more hardware devices of the computer system. During the pre-boot phase, identification information for the hardware devices is collected by the firmware. The hardware devices that are to be considered for optimization are pre-defined by the firmware. In one embodiment, the firmware identifies the central processing unit (CPU) and/or the chipset of the computer system. In another embodiment, the firmware identifies the system memory of the computer system. In alternative embodiments, the firmware also identifies the hardware devices populating the ISA (Industry Standard Architecture), PCI (Peripheral Component Interface), and AGP (Accelerated Graphics Port) slots of the computer system for optimization consideration. Identification of the hardware devices includes the manufacturer and version of the hardware device. For example, a CPU may be identified as an Intel Corporation Pentium III. Methods to identify a hardware device are well known in the art.

Continuing to a block 308, the identity of the one or more hardware devices is stored. In one embodiment of an EFI-compliant computer system, the identity of the hardware device is stored as a global state variable. A global state variable is an implementation within the firmware initialization to be used when the firmware determines which hardware devices may have optimized routine libraries. In one embodiment, a global state variable is stored in memory of the computer system.

The logic proceeds to a decision block 310 to determine if all hardware devices have been identified as pre-planned by the firmware. In one embodiment, the firmware identifies the CPU, the chipset, and the memory of the computer system. In alternative embodiments, the firmware identifies other hardware components of the computer system.

If the answer to decision block 310 is no, then the logic proceeds to block 306 to identify the remaining hardware device(s). If all of the hardware device(s) according to the firmware's pre-defined plan have been identified and their respective identifications stored, then the answer to decision block 310 is yes and the logic proceeds to a block 312.

In block 312, the firmware determines the optimized routine library for the hardware device(s). Based on the stored hardware identification information, the firmware determines which optimized routine library would provide the optimal performance for the computer system.

An optimized routine library is a binary file that provides optimized functions for one or more devices. For example, a CPU has optimized routines that software executing on the CPU can take advantage of to speed up the software's performance. When software is compiled, the compiler generates object code according to the CPU that the software will be executed on. However, if software is compiled for an older CPU with an older instruction set, such as the SSE instruction set, then the software cannot take advantage of the new instructions tailored for a newer CPU, such as SSE2 for the Intel Pentium IV.

A compiler can compile source code to produce generic object code or object code tailored for a specific instruction set. Generic object code is compiled to run on any IA-32 (Intel Architecture 32-bit processor) architecture. CPU's are produced to be able to execute this generic object code so that older software is able to execute on the newest CPU's. A compiler can also generate object code tuned for a specific instruction set of a processor (e.g., an Intel Pentium III with SSE instructions, an Intel Pentium IV with SSE2 instructions).

Software developers can also take advantage of intrinsics in writing source code to optimize performance. Intrinsics are C-like function calls for which the compiler generates optimal code. Intrinsic functions are known by the compiler and directly map to a sequence of one or more assembly language instructions. Intrinsics give programmers access to processor-specific extensions without the difficulty of writing inline assembly code. The intrinsics are much more efficient to write than assembly code because the compiler takes care of register allocation and instruction scheduling for the programmer. However, intrinsics are written for a specific CPU. Platform-based optimization by firmware allows the software to take advantage of newer CPU instruction sets on a current platform that the intrinsics may have not been written for.

A chipset may also have optimized routines. A chipset is a group of microchips designed to work as a unit in performing one or more related functions to support the computer system. An example of a chipset is the Intel 430HX PCI set for the Pentium microprocessor. A chipset provides such components as a PCI bus controller, support for multimedia, and support for a Universal Serial Bus (USB).

A memory structure of a computer system may have optimized routines. In one embodiment, the firmware identifies the type of memory devices populating the DIMM (Dual Inline Memory Module) of the computer system. Non-exhaustive examples of memory devices are described in conjunction with FIG. 4.

The optimized routine libraries are maintained in one or more storage devices accessible by the firmware of the computer system. In one embodiment, all of the optimized routine libraries are stored in the same place; while in another embodiment, they are stored in different places. Storage areas for a library include, but is not limited to, non-volatile memory (such as Flash memory), an EFI system partition, a Host Protected Area (HPA) of a hard disk, a network repository, or the like.

An HPA is a reserved area for data storage on a hard disk outside of the normal file system. Usually an HPA is not "seen" by the operating system and is only accessible by the firmware of the computer system. An HPA specification has been published as "ANSI NCITS 346-2001 Protected Area Run Time Interface Extension Services" (American National Standards Institute (ANSI) and National Committee on Information Technology Standards (NCITS)).

As depicted in block 312, the firmware uses the identification of the hardware device(s) to determine the optimized routine library. In one embodiment, the firmware uses logic as shown in Table 1 as follows.

TABLE 1

| CPU | Chipset | Optimized Routine Libraries |
|-----|---------|----------------------------|
| A   | 1, 2, 3 | A1, A2, A3                 |
| B   | 1, 2, 3 | B1, B2, B3                 |

In one embodiment, as shown in Table 1, the firmware has access to optimized routine libraries for CPU A and B in combination with chipsets 1, 2, and 3. Thus, after identifying the CPU and chipset, the firmware will advertise the corresponding optimized routine library. For example, if the computer system includes CPU B and chipset 2, then the firmware will advertise optimized routine library B2. Thus, a computer system may have access to a set of optimized routine libraries for various platform configurations. The firmware finds the appropriate optimized routine library from the set of libraries based on the current platform configuration. Once the optimized routine library is determined, the library is loaded into memory from its storage device if the library has not been loaded already. In one embodiment, if an optimized routine library matching the platform configuration is not found, then no optimized routine library is loaded into memory nor advertised to the computer system.

Continuing in FIG. 3, once the firmware finds the optimized routine library, the logic proceeds to a block 314 to advertise the optimized routine library to the computer system. In one embodiment, the optimized routine library is advertised through Advanced Configuration and Power Interface (ACPI) methods. ACPI is an industry specification to describe interfaces between computer system components. ACPI involves hardware interfaces, software interfaces, and data structures (specification available at www.acpi.info).

In ACPI, the optimized routine library is advertised through an ACPI data structure. In an ACPI-compatible system, a Root System Description Pointer (RSDP) is located in the system's memory address space. The RSDP contains the address of the Root System Description Table (RSDT), which points to other description tables that provide information to the operating system (e.g., the Differentiated System Description Table (DSDT).

In one embodiment, the optimized routine library is advertised in a Secondary System Description Table (SSDT). An SSDT is a continuation of a Differentiated System Description Table (DSDT). Multiple SSDT's can be used as part of a computer system description. An SSDT provides information to the OS (or an application) regarding the location of the optimized routine library in memory.

During OS installation the operating system must obtain the RSDP structure from the platform. When the OS (via OSPM (Operating System-directed Power Management)) locates the RSDP structure, it then locates the RSDT (or the Extended Root System Description Table (XSDT)) using the physical system address supplied in the RSDP. From the RSDP, the computer system can discover the SSDT pointing to the optimized routine library.

In another embodiment, an EFI-compliant system can use ACPI structures to advertise the optimized routine library. The operating system finds the RSDP in an EFI-compliant system as follows. In EFI enabled systems a pointer to the RSDP structure exists within the EFI System Table 202. The OS Loader's EFI image is provided a pointer to the EFI System Table 202 at invocation. The OS Loader must retrieve the pointer to the RSDP structure from the EFI System Table 202 and convey the pointer to the OS, using an OS dependent data structure, as part of the handoff of control from the OS Loader to the OS.

The OS Loader locates the pointer to the RSDP structure by examining the EFI Configuration Table 208 within the EFI System Table 202. The EFI Configuration Table 208 includes an entry (GUID (Globally Unique Identifier)/pointer pair) for the RSDP. The OS Loader retrieves the pointer to the RSDP structure from the EFI System Table before assuming platform control via the EFI ExitBootServices interface.

In another embodiment, the optimized routine library is advertised through the EFI Configuration Table of an EFI-compliant system. During the pre-boot phase of an EFI-compliant system, the EFI System Table 202 is constructed. The EFI System Table 202 contains EFI Configuration Table 208. The EFI Configuration Table 208 includes a set of GUID/pointer pairs. In one embodiment, the GUID is used as an identifier for the optimized routine library and the corresponding pointer indicates the location of the library in memory.

Continuing in FIG. 3, the logic proceeds to a block 316 to boot the target operating system. During OS runtime, the operating system (and applications) of the computer system have access to the optimized routine library discovered and advertised by the firmware.

In one embodiment, the source code should provide instructions for the software to check for optimized routine libraries. For example, the source code may include InitOptimalLibrary ( ); in a function call of a user library. Such a line commands the user library to look for an optimal routine library before executing the function. In one embodiment, the optimal routine library will be loaded by the user library.

Generally, a hardware vendor (e.g., a CPU manufacturer) may provide optimized routine libraries. In some instances, these libraries will be loaded onto a computer system by a platform vendor. Thus, when a new computer system leaves a factory, it will have the latest optimized routines for its newest hardware even though the OS or applications were compiled for older hardware devices.

Additionally, platform-based optimizations provided by firmware can occur throughout the life of the computer system. If a user installs a hardware device in a computer system, the user can update the optimized routine libraries of the computer system. In one embodiment, the new hardware device is shipped with the new library binary on a storage medium, such as a CD-ROM. In another embodiment, the new library binary is downloaded to the computer system, such as over the Internet. Thus, the user can maximize the performance of new hardware while still using older software that was written and compiled without knowledge of the new hardware.

Figure 4:
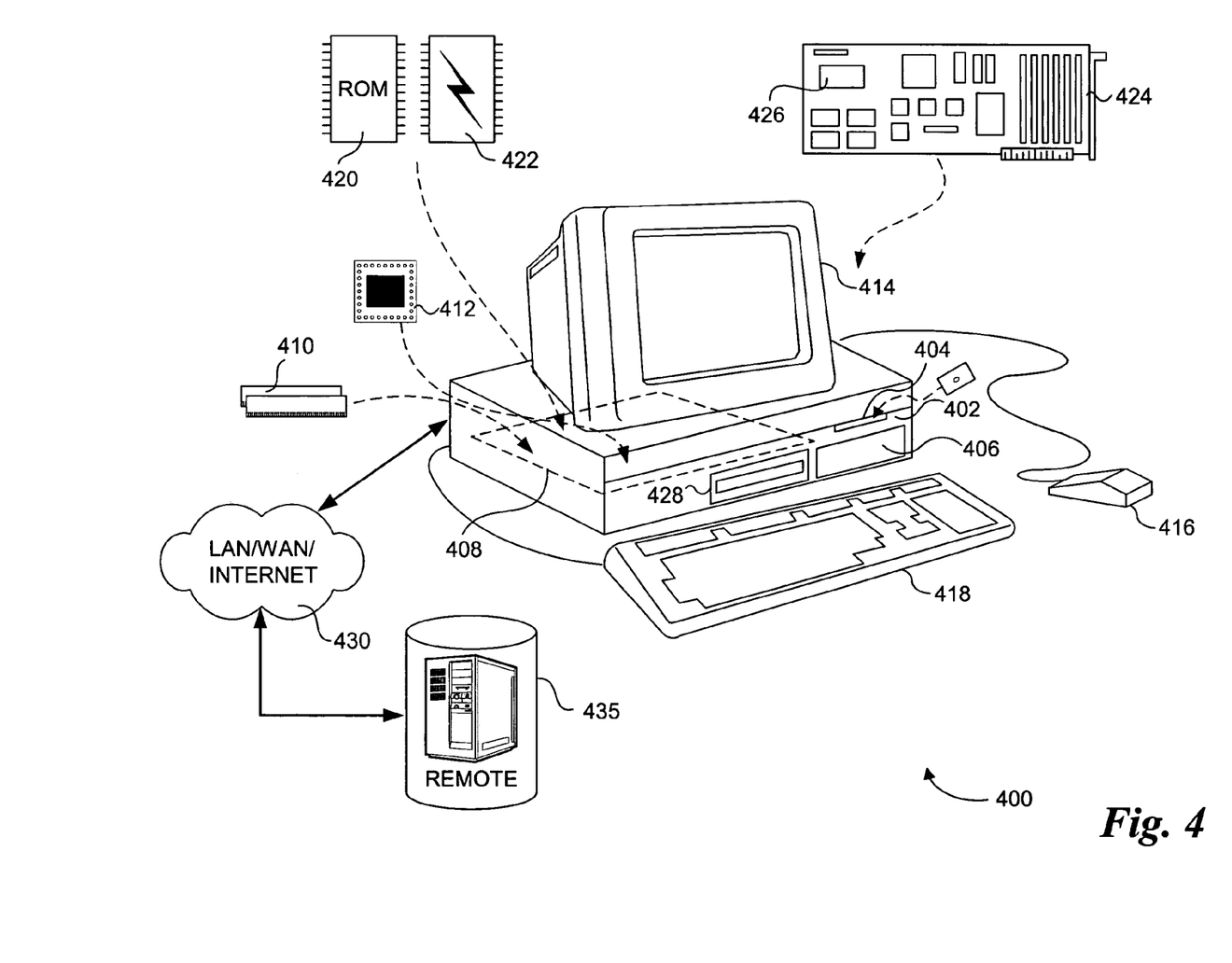
FIG. 4 is a schematic diagram illustrating one embodiment of a computer system in accordance with the teachings of the present invention.

FIG. 4 illustrates an embodiment of an exemplary computer system 400 to practice an embodiment of the invention described above. Computer system 400 is generally illustrative of various types of computer devices, including personal computers, laptop computers, workstations, servers, etc. For simplicity, only the basic components of the computer system are discussed herein. Computer system 400 includes a chassis 402 in which various components are housed, including a floppy disk drive 404, a hard disk 406, a power supply (not shown), and a motherboard 408. The motherboard 408 includes a memory 410 coupled to one or more processors 412. Memory 410 may include, but is not limited to, Dynamic Random Access Memory (DRAM), Static Random Access Memory (SRAM), Synchronized Dynamic Random Access Memory (SDRAM), Double Data Rate Synchronized Dynamic Random Access Memory (DDR-SDRAM), Rambus Dynamic Random Access Memory (RDRAM), or the like. Processor 412 may be a conventional microprocessor including, but not limited to, an Intel Corporation x86, Pentium, or Itanium family microprocessor, a Motorola family microprocessor, or the like. Hard disk 406 may comprise a single unit, or multiple units, and may optionally reside outside of computer system 400.

The computer system 400 also includes a non-volatile memory device on which firmware is stored. Such non-volatile memory devices include a ROM device 420 or a flash device 422. Other non-volatile memory devices include, but are not limited to, an Erasable Programmable Read Only Memory (EPROM), an Electronically Erasable Programmable Read Only Memory (EEPROM), or the like. The computer system 400 may include other firmware devices as well (not shown).

A monitor 414 is included for displaying graphics and text generated by firmware, software programs and program modules that are run by computer system 400, such as system information presented during system boot. A mouse 416 (or other pointing device) may be connected to a serial port, USB (Universal Serial Bus) port, or other like bus port communicatively coupled to processor 412. A keyboard 418 is communicatively coupled to motherboard 408 in a similar manner as mouse 416 for user entry of text and commands. In one embodiment, computer system 400 also includes a network interface card (NIC) or built-in NIC interface (not shown) for connecting computer system 400 to a computer network 430, such as a local area network (LAN), wide area network (WAN), or the Internet. In one embodiment network 430 is further coupled to a remote computer 435, such that computer system 400 and remote computer 435 can communicate. In one embodiment, a portion of the computer system's firmware is loaded during system boot from remote computer 435.

The illustrated embodiment further includes an optional add-in card 424 that is coupled to an expansion slot of motherboard 408. In one embodiment, add-in card 424 includes an Option ROM 426 on which firmware is stored. Computer system 400 may also optionally include a compact disk-read only memory ("CD-ROM") drive 428 into which a CD-ROM disk may be inserted so that executable files, such as an operating system, and data on the disk can be read or transferred into memory 410 and/or hard disk 406. Other mass memory storage devices may be included in computer system 400.

In another embodiment, computer system 400 is a handheld or palmtop computer, which are sometimes referred to as Personal Digital Assistants (PDAs). Handheld computers may not include a hard disk or other mass storage, and the executable programs are loaded from a corded or wireless network connection into memory 410 for execution by processor 412. A typical computer system 400 will usually include at least a processor 412, memory 410, and a bus (not shown) coupling the memory 410 to the processor 412.

It will be appreciated that in one embodiment, computer system 400 is controlled by operating system software that includes a file management system, such as a disk operating system, which is part of the operating system software. For example, one embodiment of the present invention utilizes Microsoft Windows® as the operating system for computer system 400. In another embodiment, other operating systems such as, but not limited to, the Apple Macintosh operating system, the Linux operating system, the Microsoft Windows CE® operating system, the Unix operating system, the 3Com Palm operating system, or the like may also be use in accordance with the teachings of the present invention.

Thus, embodiments of this invention may be used as or to support a firmware and software code executed upon some form of processing core (such as processor 412) or otherwise implemented or realized upon or within a machine-readable medium. A machine-readable medium includes any mechanism that provides (i.e., stores and/or transmits) information in a form readable by a machine (e.g., a computer, network device, personal digital assistant, manufacturing tool, any device with a set of one or more processors, etc.). For example, a machine-readable medium includes, but is not limited to, recordable/non-recordable media (e.g., a read only memory (ROM), a random access memory (RAM), a magnetic disk storage media, an optical storage media, a flash memory device, etc.). In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   identifying at least one hardware device of a computer system by firmware during a pre-boot phase of the computer system;
   determining if an optimized routine library for the at least one hardware device is accessible to the firmware, the optimized routine library providing optimized functions for the at least one hardware device; and
   if the optimized routine library is accessible to the firmware, advertising the optimized routine library to the computer system.

2. The method of claim 1, further comprising storing the identity of the at least one hardware device.

3. The method of claim 1 wherein the at least one hardware device comprises at least one of a central processing unit (CPU), a chipset, and a memory device.

4. The method of claim 3 wherein the optimized routine library comprises an instruction set for the CPU.

5. The method of claim 1 wherein advertising the optimized routine library comprises advertising the optimized routine library through a data structure compatible with an Advanced Configuration and Power Interface (ACPI) standard.

6. The method of claim 1 wherein advertising the optimized routine library comprises advertising the optimized routine library through a data structure compatible with an Extensible Firmware Interface (EFI) framework standard.

7. The method of claim 1 wherein the optimized routine library is stored in the computer system.

8. The method of claim 1, further comprising providing the computer system access to a new optimized routine library.

9. The method of claim 1, further comprising loading at least a portion of the optimized routine library into a memory device of the computer system.

10. The method of claim 1 wherein determining if an optimized routine library for the hardware device is available to the firmware comprises matching the at least one hardware device that is identified against a set of optimized routine libraries accessible to the firmware.

11. The method of claim 1 wherein the firmware executed by the computer system to operate in accordance with an Extensible Firmware Interface (EFI) framework standard.

12. An article of manufacture comprising:
    a machine-readable medium including a plurality of instructions which when executed perform operations comprising:
    identifying at least one hardware device of a computer system during a pre-boot phase or the computer system, wherein the at least one hardware device includes a central processing unit (CPU);
    finding an optimized routine library accessible to the computer system for the at least one hardware device, the optimized routine library providing optimized functions for the at least one hardware device; and
    advertising the optimized routine library to the computer system.

13. The article of manufacture of claim 12 wherein the at least one hardware device includes a chipset electrically coupled to the CPU.

14. The article of manufacture of claim 12 wherein the optimized routine library comprises a set of microprocessor instructions for the CPU.

15. The article of manufacture of claim 12 wherein the optimized routine library is one of a set of optimized routine libraries stored on the computer system.

16. The article of manufacture or claim 15 wherein the set of optimized routine libraries is stored in a non-volatile storage device of the computer system.

17. The article of manufacture of claim 15 wherein execution of the plurality of instructions further perform operations comprising updating the set of optimized routine libraries with a new optimized routine library.

18. The article of manufacture of claim 12 wherein advertising the optimized routine library comprises providing information regarding the optimized routine library to the computer system in an Extensible Firmware Interface (EFI) table.

19. The article of manufacture of claim 12 wherein advertising the optimized routine library comprises providing information regarding the optimized routine library to the computer system in an Advanced Configuration and Power interface (ACPI) table.

20. The article of manufacture of claim 12 wherein execution of the plurality of instructions further perform operations comprising storing the identity of the at least one hardware device.

21. The article of manufacture of claim 12 wherein execution of the plurality of instructions further perform operations comprising loading at least a portion of the optimized routine library into a memory device of the computer system.

22. The article of manufacture of claim 12 wherein the plurality of instructions to operate in accordance with an Extensible Firmware Interface (EFI) framework standard.

23. A computer system, comprising:
    a processor; and
    at least one flash device operatively coupled to the processor, the at least one flash device including firmware instructions which when executed by the processor perform operations comprising:
    identifying the processor during a pit-boot phase of the computer system;
    searching For an optimized routine library for the processor, the optimized routine library providing optimized functions for the processor; and advertising the optimized routine library for the processor to the computer system.

24. The computer system of claim 23 wherein the optimized routine library is stored in the at least one flash device.

25. The computer system of claim 23 wherein execution of the firmware instructions further perform operations comprising storing a new optimized routine library for the computer system in the at least one flash device.

26. The computer system of claim 23 wherein advertising the optimized routine library comprises:
  loading at least a portion of the optimized routine library into a memory device operatively coupled to the processor; and
  providing information to the computer system in a data structure regarding the optimized routine library in the memory device.

27. The computer system of claim 26 wherein the data structure comprises an EFI configuration table.

28. The computer system or claim 26 wherein the data structure comprises an Advanced Configuration and Power Interface (ACPI) table.

29. The computer system of claim 23 wherein the firmware instructions operate in accordance with an Extensible Firmware Interface (EFI) framework standard.

* * * * *